ically mounted in the
United States Patent [19]
McKee, deceased

[11] 3,970,103
[45] July 20, 1976

[54] RETRACTABLE GAS LINE CONNECTING APPARATUS
[75] Inventor: Albert E. McKee, deceased, late of Chicago, Ill., Harris Trust and Savings Bank, executor
[73] Assignee: Oxequip Health Industries Inc., Chicago, Ill.
[22] Filed: Jan. 2, 1974
[21] Appl. No.: 432,108

Related U.S. Application Data
[63] Continuation of Ser. No. 265,050, June 21, 1972, abandoned.

[52] U.S. Cl.............................. 137/357; 137/359; 251/150; 285/64; 285/302
[51] Int. Cl.² .......................................... F16L 3/18
[58] Field of Search............... 137/343, 350, 355.16, 137/355.17, 355.2, 355.23, 357, 359, 360, 362, 149; 285/64, 302; 251/150

[56] References Cited
UNITED STATES PATENTS

| | | | |
|---|---|---|---|
| 264,965 | 9/1882 | Shook | 285/302 |
| 338,599 | 3/1886 | Hughes | 285/302 |
| 2,008,574 | 7/1935 | Bock | 251/150 |
| 2,783,715 | 3/1957 | Kraus | 137/149 |
| 3,213,877 | 10/1965 | May et al. | 137/355.16 |
| 3,431,937 | 3/1969 | Hettlinger et al. | 137/355.16 |
| 3,538,950 | 11/1970 | Porteners | 251/149.6 X |

*Primary Examiner*—Alan Cohan
*Assistant Examiner*—Gerald A. Michalsky
*Attorney, Agent, or Firm*—Fred Philpitt

[57] ABSTRACT

Apparatus for connecting a ceiling terminating gas line to an item of equipment at floor level, which includes, a tubular outer member having a gas inlet end for connection to the ceiling outlet and a gas outlet end, a tubular piston rod, of substantially the same length as the outer tube, telescopoutertube with one end extending from the outlet end of the outer tube and having an internal diameter substantially smaller than the internal diameter in the outer tube, an annular piston mounted on the opposite end of the piston rod in the annular space between the piston rod and the outer tube which presents an annular piston surface to the opening of the gas inlet end of the outer tube and a spring mounted in the annular space between the piston rod and the outer tube having a biasing force greater than the force exerted on the piston by the gas entering the inlet end of the outer tube so that the piston is normally urged toward the inlet end of the outer tube when the apparatus is connected to the gas source. A unitary structure is provided to accommodate a plurality of different sources of gas in which a plurality of coupling elements equal in number to the number of gas lines to be served are mounted in a ceiling mountable frame structure and an equal number of the retractable piston tubes are suspended from the ceiling couplings. A section of flexible hose can also be connected between the ceiling couplings and the retractable piston tubes.

16 Claims, 3 Drawing Figures

RETRACTABLE GAS LINE CONNECTING APPARATUS

This is a continuation of application Ser. No. 265,050, filed June 21, 1972, now abandoned.

BACKGROUND OF THE INVENTION

In an operating room or other service room of a hospital, it is necessary to supply oxygen, vacuum, air, nitrous oxide, nitrogen, helium, carbon dioxide and other non-flammable gases for use in anesthesia gas machines, respirators, ventilators, assistors, surgical vacuum centers, etc.

As a matter of convenience and to save valuable space, such gases are normally supplied from piping in the ceiling of the room. This then makes it necessary to have some connection between the gas outlet in the ceiling and the piece of equipment located at floor level. However, by the same token, such connections should be normally located above the heads of people working in the room but sufficiently close to the floor that they can be readily connected to the piece of equipment. A wide variety of attempts have been made to solve those problems.

The simplest of these approaches is to have a rubber tube connected to the ceiling outlet hanging down into the room to a height above the heads but within reach of the workers. A connection is then made from the gas machine by another flexible hose. In making this connection, the operator must hold the flexible hose dangling from the ceiling with one hand and connect the flexible hose from the piece of equipment with the other hand. This, however, is not a satisfactory solution and other proposals have been made.

For example, the flexible hoses hanging from the ceiling can be made longer than in the previous approach and a chain reel can be attached part way up the hose with the end of the chain extending down and attached to the hose at a lower position. In this manner, the hose can be pulled down to connect to the piece of equipment and when the hose is released, the chain will be reeled in by the reel and form a loop in the hose holding it above the height of the working area. There are numerous problems connected with this type of equipment. Specifically, the reels gather dust and each time the hose is extended, a certain amount of this dust and debris will be scattered in the operating area below. In addition, the chains, reels and particularly, the loops formed in the hoses have a tendency to become entangled and hooked upon one another thereby, at times, requiring a certain amount of untangling before they can be used. It has also been a problem in installations such as this to attempt to keep the hose from doubling up or bending to the point where it will eventually become flattened and/or broken at the point of bending.

Yet another approach has been to mount a large reel in the ceiling and to actually reel a flexible hose itself up into the ceiling. The disadvantages of this type of operation are even more numerous than the other approaches. Such a reel must have a rather strong spring in order to reel the hose all the way from floor level to the ceiling. Consequently, when the hose is released, it generally strikes the ceiling in the same manner as a window shade when it is released. This often jerks a piece of equipment up off the floor. In order to prevent the coupling element on the end of the hose from hitting the ceiling and causing damage, there is usually a ball slidably mounted on the hose above the coupling. However, when the hose is released a number of times, striking the ceiling with some force, the ball is shoved closer and closer to the end of the hose. It is also quite obvious that with this type of equipment, one must stand on a chair or step ladder to actually reach the end of the hose when it is held against the ceiling. The reel necessarily causes considerable flattening and pinching of the hose, and eventually, the hose begins to leak, is broken or is flattened to the extent that gas passage therethrough is inhibited. The reel, of course, also collects dust and debris which is released when the hose is pulled down.

Still another approach is to provide a vacuum retractable ceiling mounted column in which all of the various facilities are enclosed and which is adapted to be pulled down from the ceiling for making the connection to the piece of equipment and then pushed back toward the ceiling. Despite the fact that the operator can reach up to the column and connect the piece of equipment to the column with one hand, such a column simply brings the coupling down about 15 inches from its initial position. Obviously, such ceiling columns are extremely expensive and unduly cumbersome.

Recognizing the deficiencies of the previously mentioned prior art structures, some manufacturers have gone to the extent of taking a gasoline station ceiling hose reel and converting it to operating room use. However, this type of equipment has rotating seals and it is almost impossible to make a rotating seal that will hold dry oxygen under pressure without a certain amount of leakage.

It is therefore an object of the present invention to provide a simple, inexpensive and convenient apparatus for connecting a ceiling gas outlet to a piece of equipment located at floor level. Another and further object of the present invention is to provide an apparatus for connecting a ceiling mounted gas outlet to a piece of equipment located at floor level which is normally above the working height of the room but can be readily pulled down to make a connection to the equipment. Still another object of the present invention is to provide an apparatus for connecting a ceiling mounted gas outlet to a piece of equipment located at floor level which has a sufficient amount of flexibility so that an accidental striking of the apparatus will not injure the operator or knock over the equipment to which it is connected. Another and further object of the present invention is to provide an apparatus for connecting a ceiling mounted gas outlet to a piece of equipment located at floor level which is not prone to collect dirt and scatter such dirt in the working area when the apparatus is operated. These and other objects and advantages of the present invention will be apparent from the following description.

SUMMARY OF THE INVENTION

The present invention relates to an apparatus for connecting a ceiling mounted gas outlet to an item of equipment located at floor level which includes a tubular outer member having a gas inlet end and a gas outlet end, a tubular piston rod, of substantially the same length as the outer member, telescopically mounted in the outer member with one end thereof extending from the outlet end of the outer member and having an internal diameter substantially smaller than the internal diameter of the outer member, a piston mounted on the opposite end of the piston rod in the annular space between the piston rod and the outer member to thereby present an annular piston surface to the opening at the gas inlet end of the outer member and a spring mounted in the annular space between the piston rod and the outer member and having a biasing force greater than the force exerted on the piston by gas entering the inlet end of the outer member.

DESCRIPTION OF THE PREFERRED EMBODIMENTS

Figure 1:
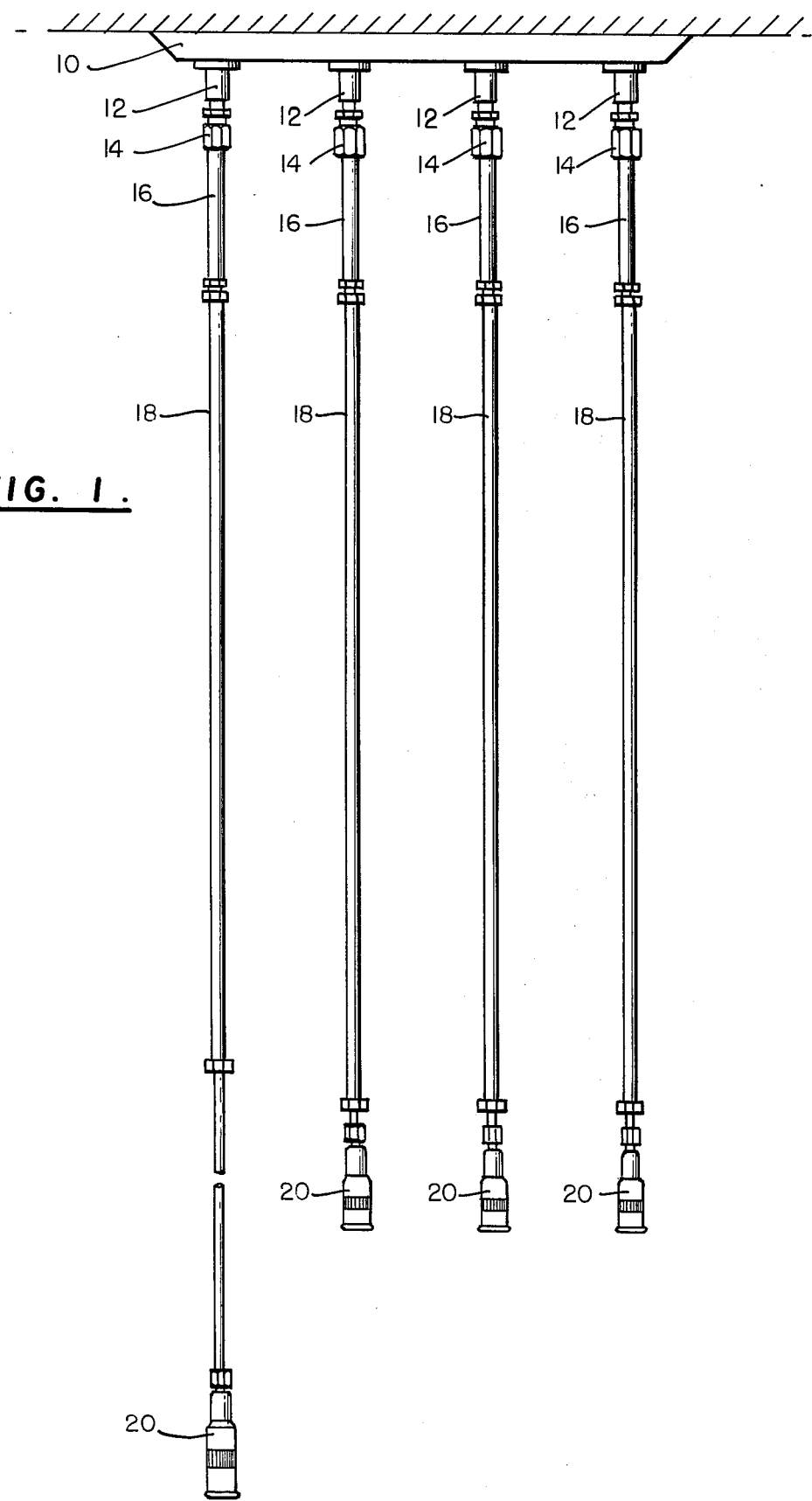
FIG. 1 is an overall view of the apparatus of the present invention mounted on the ceiling of a room.

In accordance with FIG. 1, the apparatus is connected to the ceiling of the room through the mounting plate 10. Extending through mounting plate 10 are fixed outlet couplings 12. Mounted in fixed couplings 12 are removable coupling elements 14. Mounted in the removable couplings 14 are short hose type connectors 16. Mounted on the lower end of hose connectors 16 are retractable, differential piston extenders 18. Mounted on the lower free end of extenders 18 are bayonet-type connectors 20 for connecting the apparatus to the inlet of a piece of equipment located at floor level.

Figure 2:
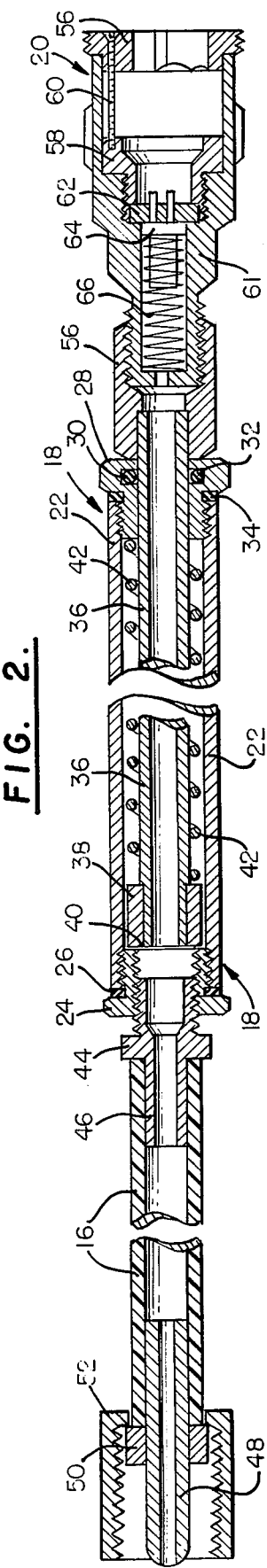
FIG. 2 is a cross-sectional view of the apparatus of the present invention.

FIG. 2 of the drawings shows differential piston extender 18 together with hose connectors 16 and bayonet-type connector 20. The retractable, differential piston extender 18 includes an outer member or tube 22 made of a suitable material, such as, aluminum or copper tubing. Mounted in the inlet or upper end of tube 22 is top bushing 24 with an appropriate sealing washer 26, of nylon or the like, between the end of tube 22 and bushing 24. Mounted in the outlet or bottom end of tube 22 is bottom bushing 28 having a "Quad-Ring" retainer 30 and carrying Quad-Ring gasket 32. Bushing 28 is sealed against the end of tube 22 by means of washer 34. Slidably disposed within tube 22 is tubular piston rod 36, of a tubular material similar to that of tube 22. Tubular piston rod 36 is sufficiently long to extend from the inlet end of tube 22 through bushing 28 at the outlet end of tube 22. Pressure fitted on the upper end of piston rod 36 is guide piston 38. Guide piston 38 can be a fiber or rubber piston or simply a nut threaded on tube 36 with cushioning washers above it. Guide piston 38 presents an annular piston surface 40 to the gas passing through the inlet end of tube 36. Obviously, since piston rod 36 is tubular and has an internal diameter smaller than the internal diameter of tube 22, piston 38 will be acted upon by the pressure of the gas entering tube 22 and, in effect, be a differential piston. Mounted in the annular space between tube 22 and piston rod 36 is spring 42, which is under a biasing force selected on the basis of the pressurized gas entering tube 22 and the pressure of the gas service involved. For example, if gas enters tube 22 at a pressure of about 50 psi, the biasing force couneracting this counteracting should be about 60 psi. Thus, while it will be rather difficult to extend piston rod 36 when no gas pressure is applied to the end of piston 38, it will take little force to compress spring 42 when aided by the gas pressure acting against piston 38, and piston rod 36 can be readily extended. However, by the same token, once the piston rod is released, it will automatically return to the telescoped position shown in FIG. 2. Fitted into bushing 24 at the top or inlet end of extender 18 is male connector 44. Crimped onto the end of connector 44 is a flexible hose 16. The other end of flexible hose 16 is crimped onto male probe 48. Pressure-fitted onto the male probe 48 is retaining ring 50. Retaining ring 50 holds female connector 52 rotatably on the hose 16. Pressure fitted onto the outlet or lower end of piston rod 36 is female coupler 56. Threaded into female coupler 54 is the bayonet-type connector 20 carrying a suitable valve. Connector 20 is made up of a bayonet-type cap 56. Cap 56 is held securely to retainer 58 by means of screws 60. Mounted above retainer 58, in casing 61, is gasket ring 62. Passing through gasket 62 is valve stem 64. Valve stem 64 is spring-loaded by means of spring 66. Obviously, when a bayonet-type connector from the machine to be serviced with pressurized gas is inserted through cap 56, valve stem 64 is pushed upwardly against the biasing force of spring 66 permitting the passage of gas to the machine. When the bayonet-type connector is removed from cap 56, the valve automatically closes and stops the flow of gas.

Figure 3:
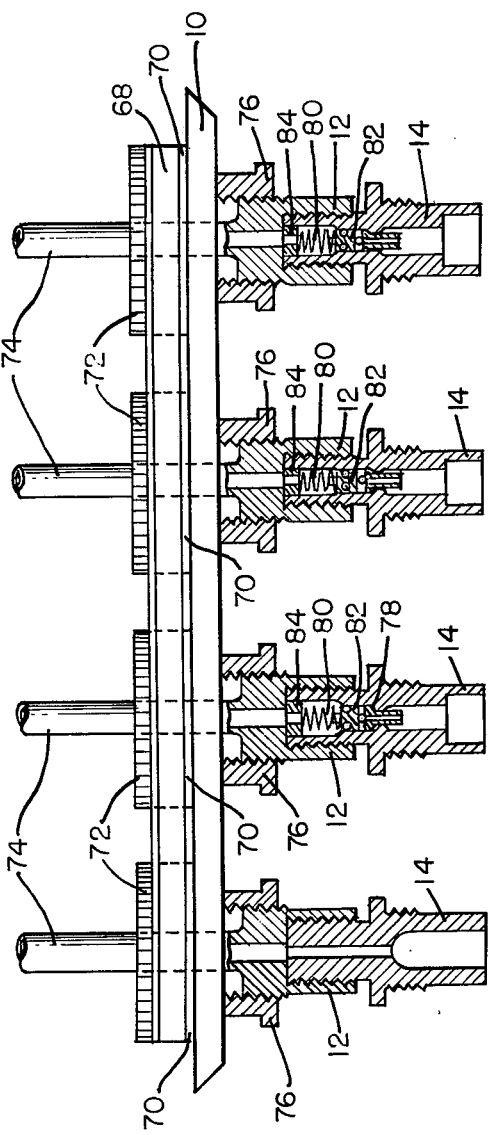
FIG. 3 is a detailed view partially in section showing the ceiling mounting arrangement and coupling means of the present invention.

FIG. 3 of the drawings shows, in greater detail, mounting plate 10, fixed outlet couplings 12 and the removable coupling elements 14. A pair of L-shaped angles 68 are welded to the front and back of solid mounting blocks 70. Welded to the top of angles 68 and mounting blocks 70 are sections of expanded metal 72. Passing through expanded metal sections 72 and blocks 70 are sections of tubing 74 which are adapted to be connected to the service line. Fixed couplings 12 are integrally formed with tubes 74 and all have the same internal threads regardless of the gas service. Threaded flanges 76 are screwed over couplings 12 and hold mounting 10 against the ceiling. Of course, blocks 70, angles 68 and expanded metal sections 72 are imbedded in the ceiling itself. As indicated, the internal threads of couplers 12 are all standardized irrespective of the type of service to be accommodated. However, the removable couplers 14 are individually designed for the particular type of service to be supplied. The couplers 14 are designed with what is known as a "diameter index safety system" that makes all of the gases noninterchangeable. In other words, the external threading and size of couplers 14 and, of course, the threading and size of couplers 52 (FIG. 2) are different for each type of gas to be supplied so that there is no chance of connecting the wrong extender to a gas supply, and the extenders are both color-coded and clearly marked to indicate the type of service supplied. For example, the coupling 14 on the left of FIG. 3 is designed as a source of vacuum. The remaining three couplers 14 are designed for gases under pressure and differ only to the extent of the size and threading on the exterior of the couplers. The vacuum coupler 14 on the left of FIG. 3 does not require a valve but simply a receptacle for a male probe 48 (FIG. 2). On the other hand, the remaining three couplers, where gases, such as, oxygen, air, nitrous oxide, nitrogen, helium, carbon dioxide or other non-flammable gases are to be supplied under pressure, all have a valve mounted in the coupler. This valve comprises a valve stem 78 which is spring-biased downwardly by means of spring 80. A ring-type gasket 82 surrounds valve stem 78. The valve is held in coupler 14 by means of an annular plug 84.

While the couplers 52 (FIG. 2) on the tops of the retractable extenders 18 (FIG. 3) are sized and threaded for a particular type of service and the extender itself is clearly marked near its lower end, all of the extenders 18 are substantially the same in construction where gases are supplied under pressure. However, the extender utilized for the vacuum service differs to the extent that a different spring 42 is utilized. Obviously, when a vacuum is being drawn through the line rather than gas being forced out under pressure, a spring having a substantially reduced biasing force must be utilized. Thus, the spring in the extender utilized for vacuum service is substantially weaker than the springs utilized for the gases under pressure. The retractable extenders may be grouped in any number of multiples from one to as many gases as would be supplied.

It is obvious that numerous modifications of the structure can be made without departing from the present invention. Accordingly, the present invention is to be limited only in accordance with the appended claims.

I claim:
1. Apparatus for connecting a plurality of gas supplying service lines terminating at ceiling level to a plurality of gas utilizing items of equipment located at floor level comprising:
   a. a ceiling and a mounting structure imbedded in said ceiling;
   b. a plurality of gas service lines extending from above said ceiling and downwardly through said mounting structure, said service lines having terminal ends located below said ceiling,
   c. a cover plate neatly covering said mounting structure and a portion of said downwardly extending service lines,
   d. means for holding said cover plate against the ceiling,
   e. a fixed outlet coupling mounted on the lower end of each service line,
   f. a removable outlet coupling attached to the lower end of each fixed outlet coupling,
   g. at least some of said removable outlet couplings containing a valve,
   h. a plurality of tubular outer members each having a gas inlet end and a gas outlet end,
   i. a plurality of flexible tubes each having an inlet end and an outlet end, the outlet end of each flexible tube being joined to the gas inlet end of each tubular outer member and the inlet end of each flexible tube being joined to one of said removable outlet couplings,
   j. an elongated tubular piston rod telescopically mounted within each of said tubular outer members within the outlet end of each tubular piston rod extending through the outlet end of each of said tubular outer members,
   k. piston means mounted on the inlet end of each of said tubular piston rods in the annular space between each of said tubular piston rods and each said tubular outer member and presenting an annular piston surface to the gas inlet end of said tubular outer member,
   l. spring means mounted in said annular space between each piston rod and each tubular outer member and adapted to apply a biasing force to urge said piston toward said inlet end of said tubular outer member; and
   m. means for coupling the outlet end of each said piston rod to an item of equipment.

2. Apparatus adapted to interconnect (1) a termination gas line extending downwardly through a ceiling to (2) an item of gas utilizing equipment located on the floor beneath the ceiling, comprising in combinaton:
   a. a tubular outer member having a gas inlet end and a gas outlet end;
   b. a tubular piston rod of substantially the same length as said tubular outer member telescopically mounted in said tubular outer member with a first end thereof extending outwardly from said outlet end of said tubular outer member and having an internal diameter substantially smaller than the internal diameter of said tubular outer member;
   c. piston means mounted on the other end of said piston rod in the annular space between said piston rod and said tubular outer member and presenting an annular piston surface to the opening of said gas inlet end of said tubular outer member;
   d. spring means mounted in said annular space between said piston rod and said tubular outer member which exerts a biasing force on said piston greater than the force exerted on said piston at the gas inlet end of said tubular outer member, whereby said piston is urged toward said inlet end of said tubular outer member when the apparatus is connected to said gas line;
   e. a fixed coupling means mounted in the ceiling for coupling said inlet end of said tubular outer member to a termination gas line; and
   f. means for coupling said first end of said piston rod to an item of equipment located on the floor beneath said ceiling.

3. Apparatus in accordance with claim 2 wherein the inlet end of said tubular outer member is connected to said fixed coupling through a section of flexible tubing.

4. Apparatus in accordance with claim 2 wherein the inlet end of said tubular outer member is connected to said fixed coupling through a removable coupling.

5. Apparatus in accordance with claim 4 wherein said removable coupling is distinctively shaped for a particular gas service.

6. Apparatus in accordance with claim 4 wherein said removable coupling carries a valve and the inlet end of said tubular outer member includes means for opening said valve when said tubular outer member is connected to said removable coupling.

7. Apparatus in accordance with claim 2 which includes an annular flange and a cover plate that is adapted to be held against the ceiling above the fixed coupling by means of said annular flange.

8. Apparatus in accordance with claim 2 wherein the means for coupling the first end of the piston rod to the item of gas utilizing equipment includes a bayonet-type connector.

9. The combination which comprises
   a. a ceiling and a mounting structure imbedded in the ceiling,
   b. a plurality of gas service lines extending downwardly from said ceiling and through said mounting structure,
   c. a cover plate neatly covering said service lines and said mounting structure, d. means for holding said cover plate against the ceiling and above the terminal ends of said service lines, e. a plurality of differential piston extenders wherein each of said differential piston extenders comprises
  1. a tubular outer member having an inlet end and an outlet end;
  2. a tubular piston rod of substantially the same length as said tubular outer member telescopically mounted in said tubular outer member with a first end thereof extending from said outlet end of said tubular outer member and having an internal diameter substantially smaller than the internal diameter of said tubular outer member,
  3. piston means mounted on the other end of said piston rod in the annular space between said piston rod and said tubular outer member and presenting an annular piston surface to the opening of said inlet end of said tubular outer member,
  4. spring means mounted in said annular space between said piston rod and said tubular outer member which exerts a biasing force on said piston greater than the force exerted on said piston at the inlet end of said tubular outer member, whereby said piston is urged toward said inlet end of said tubular outer member when the extender is connected to a gas service line,
  5. means for coupling said first end of said piston rod to an item of gas utilizing equipment, and f. a plurality of removable attaching means for coupling a plurality of said differential piston extenders to said service lines, each removable attaching means having an outlet end and an inlet end wherein the outlet end of each of said removable attaching means is distinctively formed for each service line so as to prevent improper equipment attachments to said service lines.

10. Apparatus in accordance with claim 9 wherein the inlet end of said tubular outer member is connected to said removable attaching means through a section of flexible tubing.

11. Apparatus in accordance with claim 9 wherein each of said service lines terminates in a fixed coupling mounted below said ceiling level.

12. Apparatus in accordance with claim 11 wherein said cover plate is held against the ceiling above said fixed couplings by means of an annular flange passing over and engaging said fixed couplings.

13. Apparatus in accordance with claim 11 wherein said removable attaching means comprise a plurality of removable couplings, the inlet end of said removable couplings being adapted to engage said fixed couplings.

14. Apparatus in accordance with claim 13 wherein said removable coupling carries a valve and the inlet end of said tubular outer member includes means for opening said valve when said tubular outer member is connected to said removable coupling.

15. Apparatus in accordance with claim 9 wherein the means for coupling the first end of the piston rod to an item of gas utilizing equipment includes a valve.

16. Apparatus in accordance with claim 9 wherein the means for coupling the first end of the piston rod to the item of gas utilizing equipment includes a bayonet-type connector.

* * * * *